Oct. 5, 1965 P. CONSTANTAKES 3,210,707

SOLID STATE INDUCTOR BUILT UP OF MULTIPLE THIN FILMS

Filed Oct. 4, 1962 2 Sheets-Sheet 1

INVENTOR.
PETER CONSTANTAKES

BY James & Franklin

ATTORNEYS

INVENTOR.
PETER CONSTANTAKES

BY James & Franklin

ATTORNEYS

United States Patent Office 3,210,707

Patented Oct. 5, 1965

3,210,707

SOLID STATE INDUCTOR BUILT UP OF MULTIPLE THIN FILMS

Peter Constantakes, Woonsocket, R.I., assignor to General Instrument Corporation, Newark, N.J., a corporation of New Jersey Filed Oct. 4, 1962, Ser. No. 228,445

11 Claims. (Cl. 336—200)

This invention relates to inductors for high frequency work, and more especially to a solid state inductor.

The trend in electronic technology is to fuse components and circuits, that is, to exploit solid state effects for the realization of overall electronic functions. The ultimate objective is to provide a single monolithic block which supplies an appropriate output in response to a given input.

This trend has encountered an important limitation, namely, the absence of methods for realizing inductive parameters within the block. This need for a compact solid state inductor applies more broadly to all attempts at microminiaturization, even when not in block form.

Inductive effects arise when a force is brought to bear on a flow of current, thereby retarding it, or causing it to lag an applied voltage. The most common origin of such a force is the counter E.M.F. resulting from a change of magnetic flux linkages. In order to obtain an adequate amount of flux linkage, with the permeability of microcircuit material, conventional theory requires that a conductive loop be physically large. On the other hand, if for the purposes of size reduction, resort is made to ferromagnetic materials, severe nonlinearities result.

This difficulty has led to the fabrication of hybrid circuits; that is, circuits which are in the main constructed along the lines of microcircuit or molecular engineering concepts, but which depart from these concepts when inductive effects are required.

Some attempt has been made to fabricate a microcircuit inductor using semiconductor effects. The principle involved in these attempts is the dependence of current flow on the slow diffusion of minority carriers, causing current to lag the applied voltage. Unfortunately, side effects appear, and the equivalent circuit is not that of a pure inductance, but rather that of a complex combination of inductive, capacitive and resistive elements. Also, special biasing methods are required, with additional circuitry. The resultant inductance would not be linear.

Other attempts have been made to fabricate inductors by utilizing spiral patterns placed on insulating substrates. The patterns are made from conducting material and their spiral form provides considerable flux linkage. While this approach is usable, the inductor is not truly small, or if small the spiral introduces large values of series resistance, leading to lower Q; and the use of an air path reduces the amount of inductance obtainable.

The general object of the present invention is to overcome the foregoing difficulties and to provide an inductor capable of incorporation into solid state circuitry, or what may be termed a molecular energy building block. More specific objects are to provide such an inductor which has a linear characteristic; which has a high Q at desired frequencies; and which will operate at adequate power levels.

This is done by the use of thin magnetic films in conjunction with both conductive lines and insulating layers. The completed device is a composite structure of such layers superimposed on each other in accordance with design criteria for optimizing the inductive performance. The device is fabricated by the use of vapor deposition techniques; that is, each of the layers—magnetic, insulating and conductive, will be produced by evaporating the appropriate materials in a high vacuum system onto an appropriate substrate.

Such a device can be readily incorporated into microcircuits as an integral part of the miniaturized design. It will provide an inductor usable in molecular engineering blocks. It promises even better performance than standard inductors in the high frequency range with respect to the Q of the device, the temperaure coefficient of inductance, and capacitive by-pass effects. The new solid state inductor is suitable for use with devices such as transistors and diodes. It improves circuit design flexibility by removing the need for microcircuits to be designed without inductive elements. Heretobefore it has been necessary to use alternative low efficiency circuitry in those cases where space and weight will not allow the use of available inductors.

To accomplish the foregoing general objects, and other more specific objects which will hereinafter appear, my invention resides in the solid state inductor elements, and their relation one to another, as are hereinafter more particularly described in the following specification. The specification is accompanied by drawings in which.

Figures 1, 2, 3, 4:
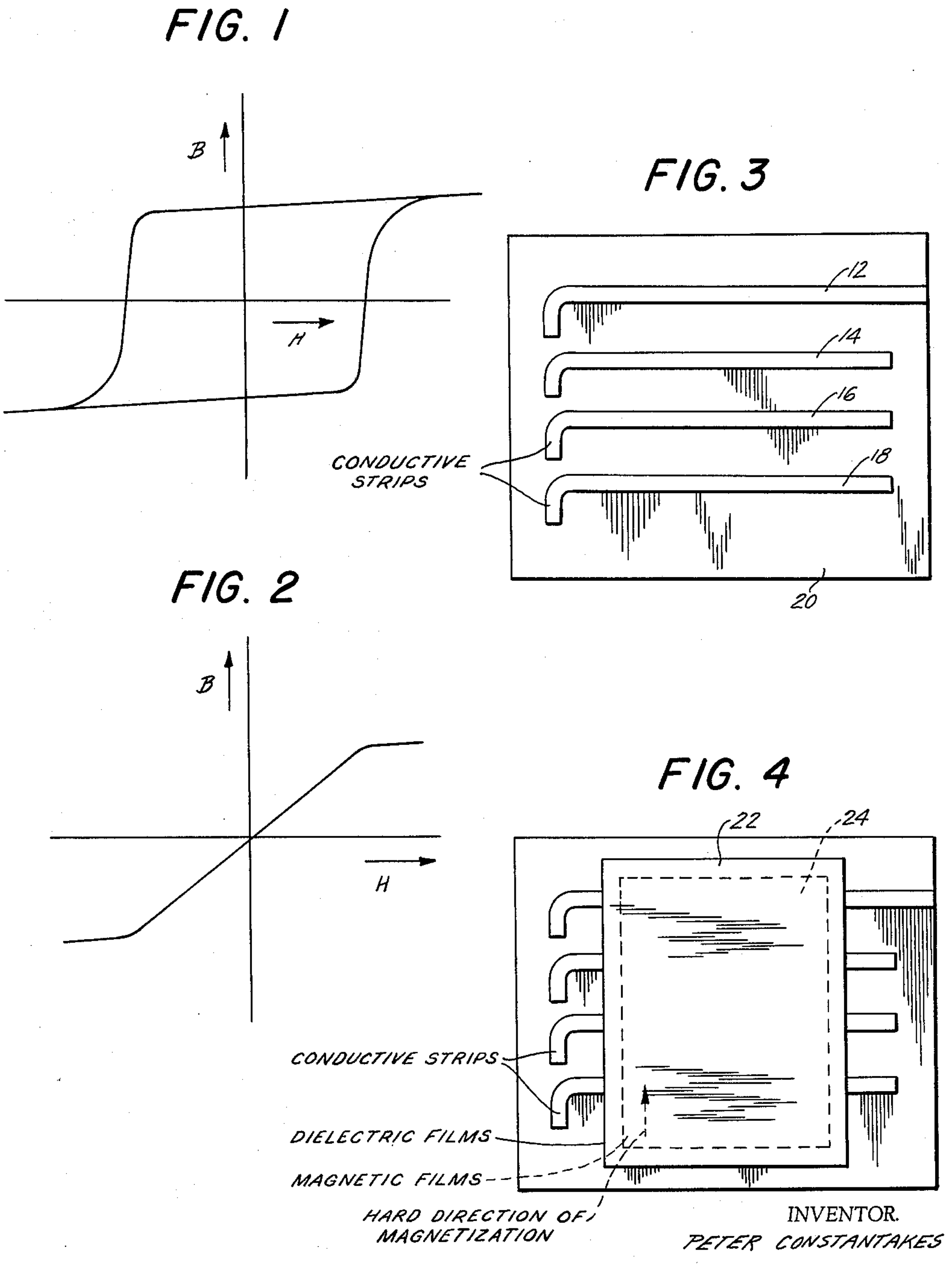
FIG. 1 is a curve showing the magnetization characteristic of a thin magnetic film, in the "easy" direction of magnetization.
FIG. 2 is a curve showing the characteristic in the "hard" direction of magnetization.
FIG. 3 shows the deposit of conductive metal strips as a first step in the fabrication of the new inductor.
FIG. 4 represents the subsequent application of alternate laminations of dielectric and magnetic films.

Thin magnetic films are anisotropic; that is, they possess an easy direction of magnetization and a hard direction of magnetization. The B vs. H characteristic in the easy direction is shown in FIG. 1, and in the hard direction is shown in FIG. 2. The variation of B with H is linear in the latter or hard direction of magnetization. It is possible to orient a conductive wire or strip with respect to a thin magnetic film so that only that flux passing in the hard direction of magnetization links with the conductor. When this is done, then, since the magnetic field intensity, H, is proportional to the current flowing in the conductor, the resulting inductance associated with the conductor is linear.

In addition to this linearity condition, there is associated with the B vs. H characteristic, in the hard direction of magnetization, a permeability of approximately $5\times10^{-3}$ henrys per meter or a value of 4000 times greater than for air ("Flux Reversal in Thin Films of 82% Ni, 18% Fe," by C. D. Olson and A. V. Pohm; Journal of Applied Physics, vol. 29, No. 3, 274–282, March 1958). Hence, the flux linking the conductor is vastly augmented.

The general principle underlying the thin film solid state inductor, then, is the employment, in a form which displays linear performance, of high permeability material to obtain inductive effects.

Figure 7:
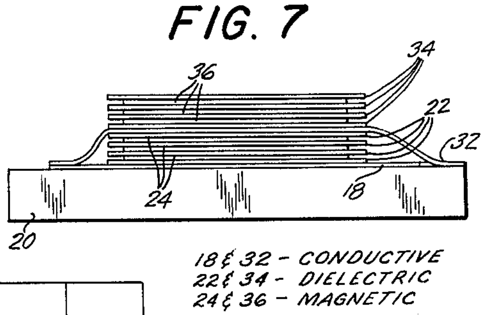
FIG. 7 is an elevational view, with the film thickness exaggerated, and the number of films reduced.

A structure for implementing the basic principle of operation is illustrated in FIGURES 3 through 6, which portray in sequence a series of fabrication steps. Referring to FIG. 3, initially a series of conductive metal strips 12, 14, 16 and 18 are vapor deposited on an insulating substrate 20. Next, a series of say twenty to fifty alternating layers of dielectric and magnetic films are vapor deposited to a form a laminated structure over the said base conductor strips. This is shown in FIGS. 4 and 7 in which 22 represents the dielectric film and 24 represents a magnetic film. These are so deposited that the base conductor strips lie perpendicular to the hard direction of magnetization. The bottom and top films should be dielectric films. Then a second series of metal strips is vapor deposited, as shown as 26, 28, 30 and 32 in FIG. 5, to cross connect the base conductor strips 12, 14, 16 and 18. The strips preferably have bends at the ends to facilitate their connection in series as shown.

Figures 5, 6:
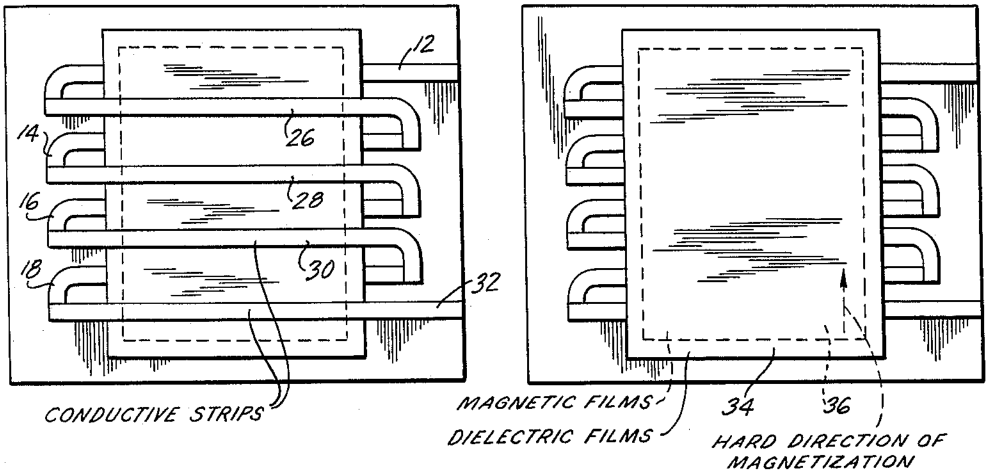
FIG. 5 shows the deposit of a second series of conductive strips connecting the first strips.
FIG. 6 represents the subsequent deposit of alternate layers of dielectric and magnetic films.

A second series of alternating layers of dielectric and magnetic films are vapor deposited atop the cross connecting strips 26, 28, 30 and 32 to form an upper laminated structure, as shown in FIGS. 6 and 7. As before, this is so done that the metal strips will lie perpendicular to the hard direction of magnetization of the magnetic films 36, the latter being separated by dielectric films 34. Here again there may be a large number of films, say twenty to fifty. In FIG. 7 the relative film thickness has been exaggerated and the number of films reduced, for clarity. The complete structure provides a series of conductive paths linking a closed magnetic circuit. In this manner a high permeability path is provided for the magnetic flux.

*Analysis*

Apart from the value of inductance exhibited by an inductive device, there are several performance characteristics by which the quality of the device may be evaluated. These performance characteristics relate to the Q of the device at various frequencies; the tmperature variation of inductance; and the extent of capacitive bypass.

A thin film inductor fabricated as described above, can be designed to exhibit extremely good Q's over a broad frequency range. This can be seen from an analysis of the dissipative factors operating in the thin film inductor. These factors are the hysteresis losses, the eddy current losses and the conductor resistance losses.

Hysteresis losses result when the energy stored in a material for a part of a cycle is not fully returned at the end of the cycle. The extent of this loss is proportiontal to the area included in the hysteresis loop. Since the thin film inductor operates along a B vs. H characteristic which lacks an hysteresis loop, there will be virtually no losses due to this factor.

Eddy current losses result when the flux passing through the magnetic material induces current flow in that material. These losses can be represented by an equivalent resistor $R_e$ whose value is given by:

$$R_e=0.00658\frac{t^2}{ptf}K_m X_L f \qquad (1)$$

where $t$=magnetic film thickness, cm.
$ptf$=resistivity of magnetic film material, micro-ohm-cm.
$K_m$=relative permeability of magnetic film material.
$f$=frequency, c.p.s.
$X_L$=inductive reactance, ohms. (See Terman's Engineering Handbook, 1948. Edition).

Since the value of this resistance is proportional to the square of the film thickness, it is evident that for films of several thousand angstroms thick, this value will be relatively small.

Because the thin film inductor makes use of evaporative conductive strips, which are themselves extremely thin (0.0001 to 0.0002 inch thick) the cross-sectional area of these strips will be small. This in turn will tend to result in relatively high values of D.C. conductor resistance. This is mitigated, however, by the fact that the overall length of the conductive strips in appreciably reduced. More important is the fact that at high frequencies of operation, skin effects (which drastically decrease the effective cross-sectional area of air core inductor coils) do not significantly alter the conductor resistance. It remains essentially at its D.C. value.

For a separation between conductive strips of $w/2$, where $w$ is the width of a single strip, the conductor resistance is given approximately by:

$$R_c=\frac{6p_c n_c^2 l_{HD} l_{ED}}{d} \qquad (2)$$

where $p_c$=resistivity of conductive strip material in ohm-cm.
$n_c$=number of conductive strip pairs per cm. along the hard direction of magnetization.
$d$=thickness of conductive strip in cm.
$l_{HD}$=thin magnetic film length along the hard direction of magnetization in cm.
$l_{ED}$=thin magnetic film length along easy direction of magnetization in cm.

The overall effect of these dissipative factors is small, and for inductors designed for high frequency operation, it will be seen that high Q's can be readily obtained.

From an analysis of the factors governing the temperature coefficients of inductance, it appears that the thin film device can be made with a superior characteristic to that of an air core inductor. In the case of an air core inductor, the major factors governing the temperature coefficient of inductance are the dimensions of the device. These dimensions determine the extent of the flux leakage. Since the dimensions vary with temperture, the flux leakage also will vary with temperature. This in turn will cause the inductance to vary. In the case of the thin magnetic film inductor, the flux leakage is eliminated by the channeling action of the magnetic material. The energy requirements of the thin film magnetization necessitates that the flux lie in the plane of the film. This minimizes the flux leakage and serves to make it independent of temperature.

The capacitive coupling in the thin film inductor between adjacent conductive strips constitutes an electrical duplicate of the capacitive coupling between adjacent coils in the air core inductor. In contrast with an air core inductor, however, this coupling is reduced to extremely small values. This is because the equivalent parallel plate areas represented by each strip are proportional to the conductive strip thicknesses, and these thicknesses are extremely small. In addition, this capacitive coupling in the thin film inductor is frequency insensitive. This is so because possible skin effects at higher frequencies leaves the separation between the equivalent parallel plates unaffected. In air core inductors, on the contrary, as skin effects come into operation, the charge carried in each coil is moved nearer the surface. This has the effect of reducing the effective separation between the equivalent parallel plates. The thin film inductor, therefore, in contrast to an air core inductor, will provide a constant inductance over a wide frequency range.

In contrast with air core inductors, the thin film inductor can be over-driven; that is, it can be operated at current levels which produce non-linear changes of flux density with current. This limitation, however, is not severe because the current levels at which non-linearity occurs are usually greater than the current levels encountered in normal practice.

*Sample design*

By way of illustrating the principles discussed above, consider a sample design of a 50 microhenry inductor which is to have a Q greater than 100 at frequencies between 238 and 248 megacycles per second. The same design procedure can be used to fabricate inductors which operate at one megacycle per second and up. The example given, and the mathematics used, are merely illustrative and are not intended to be in limitation of the invention, which instead is believed new as a structure, regardless of quantitative dimensions and the theory advanced.

The basic inductance equation is given by:

$$L=\frac{1}{2}\mu_{tf}tl_{ED}l_{HD}n_c^2N_{tf}\times10^{-2} \qquad (3a)$$

or alternatively (using Equation 2 above) by:

$$L=\frac{\mu_{tf}t(R_c)_{max.}N_{tf}d\times10^{-2}}{12p_c} \qquad (3b)$$

where $\mu_{tf}$=permeability in hard direction of thin magnetic film in henrys/meter $t$=thickness of thin mangetic film in cm.

$N_{tf}$=number of thin magnetic films $(R_c)_{max.}$=maximum allowable value of conductor resistance in ohms $l_{ED}$, $l_{HD}$, $d$, $n_c$, $p_c$, have the meanings previously given.

For a Q of 100, the maximum allowable value of $R_c$ is given by:

$$(R_c)_{max.}=\frac{X_L}{Q}-R_e \qquad (4a)$$

$$=X_L\left[\frac{1}{100}-0.00658\frac{t^2}{ptf}-K_mf\right] \qquad (4b)$$

For bulk permalloy material the value of $p_{tf}$ is approximately 20 micro-ohms-cm. ("Ferro-Magnetism"—Bell Laboratories Series, by Richard M. Bozorth. D. Van Nostrand Co., Inc.). Anticipating, however, that film thickness of less than 1000 angstroms will be required, this value may be doubled ("Vacuum Deposition of Thin Films," by L. Holland; John Wiley and Sons, Inc.—1958). The relative permeability $K_m$, as has already been stated, is approximately 4000. Thus, $$(R_c)_{max.}=(2)(3.14)(50\times10^{-6})f\left[\frac{1}{200}-0.658t^2f\right] \qquad (4c)$$

Since the value of $(R_c)_{max.}$ must be consistent with both 238 and 248 megacycles per second, then solving Equation 4c for $t$ $$t^2=\frac{1}{65.8(f_2+f_1)}=\frac{10^{-6}}{65.8(238+248)}$$

$$t\approx5.6\times10^{-6}\text{cm.}=560\text{ angstroms}$$

Inserting this value into Equation 4c and using either of the frequencies gives:

$$(R_c)_{max.}=(2)(3.14)(50\times10^{-6})(238\times10^{-6})\left[\frac{1}{100}-0.658(5.6\times10^{-6})^2(238\times10^{+6})\right](R_c)_{max.}=380\text{ ohms}$$

The resistivity of silver is $1.65\times10^{-6}$ ohm-cm. A readily obtainable value of $n_c$ is 130 strip pairs per cm. corresponding to conductive strips 0.001 inch wide and separated by a distance of 0.0005 inch. Using silver having a thickness of 0.0002 inch for the conductive strips, an $R_c$ is obtained (when $l_{ED}$=1 cm.; $l_{HD}$=1 cm.) of:

$$R_c=\frac{(6)(1.65\times10^{-6})(130)^2(1)(1)}{(0.0002)(2.54)}$$

$$R_c=224\text{ ohms}$$

This value is well below the maximum allowable value for $R_c$ of 380 ohms.

Rearranging the terms of Equation 3a and using the parameter values already obtained, the number of thin film pairs is found to be:

$$N_{tf}=\frac{200L}{\mu_{tf}t\ l_{ED}\ l_{ED}N_c^2}$$

$$N_{tf}\frac{200(50\times10^{-6})}{(5\times10^{-3})(5.6\times10^{-6})(1)(130)^2}$$

$$N_{tf}=21$$

For practical thin magnetic films, the maximum flux density, $B_{max.}$, which can be accommodated before non-linearity is reached is about 0.8 weber/meter (see reference above to Olson and Pohm). The equation for the maximum current, $i_{max.}$, therefore is given by:

$$i=\frac{i_{max.}}{\sqrt{2}}=\frac{2B_{max.}}{\sqrt{1\mu_{tf}n_c}}\frac{3200}{\sqrt{2n_c}}$$

For $n_c$=130

$$i=\frac{3100}{183}=18\text{ ma.}$$

This value represents the maximum current which can be passed through the device in the frequency range of interest without the introduction of non-linearity effects. Summarizing the final design, the parameters of interest are:

$n_c$=130 conductive strip pairs per cm.
$N_{tf}$=21 thin magnetic film pairs
$l_{ED}$=1 cm.
$l_{HD}$=1 cm.
$t$=560 angstroms
$d$=0.2 mil.
$w$=1.0 mil.

This combination of parameter values gives a thin film inductor with $L$=50 microhenrys
$Q$>100 from 238 to 248 megacycles per sec.
$i_{max.}$=18 ma. from 238 to 248 megacycles per sec.

Figure 8:
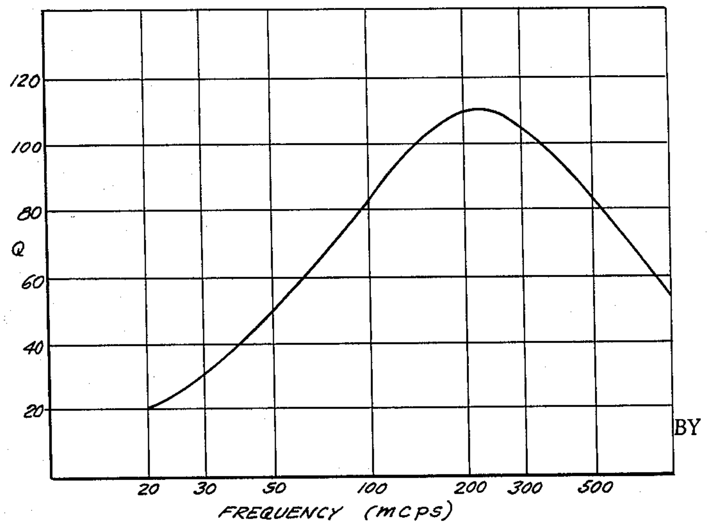
FIG. 8 is a Q curve showing a performance characteristic of the inductor.

A plot of Q vs. frequency for this inductor is shown in FIGURE 8. It can be seen from the figure that the Q has been designed to peak substantially at the frequencies of interest.

*Fabrication*

The first step in the process of fabricating an inductor is the preparation of a suitable substrate. This should be an insulating material whose coefficient of thermal expansion preferably matches that of the thin magnetic film. Acceptable materials in this regard are silicon monoxide, silicon dioxide and magnesium fluoride. The proposed material from which substrates will be fabricated, therefore, is single crystal silicon upon which thick silicon dioxide layers will be grown by a thermal oxidation process. The next step in the preparation of thin film inductors is the formation of conducting strips atop the silicon dioxide. It is essential that such strips be formed from good conducting material. In addition, they must display strong adhesive attachment to the silicon dioxide layer. Conductive strips with these characteristics can be prepared by vapor deposition methods.

Preferably the oxidized silicon substrate is accurately fitted into a jig. A properly registered mask is fitted over the substrate and the loaded jig with its mask is placed in a vacuum system where a satisfactory metal, say copper or aluminum, can be evaporated onto the substrate through the mask. To achieve the necessary adhesion of the layers and to match coefficients of expansion, multilayers of more than one material may be used. Previous work done has shown that layers formed in this manner have exceptional adhesive strength.

The third stage in the fabrication of thin magnetic film inductors requires the successive deposition of alternate films of dielectric and magnetic material. The simplest materials for use as a dielectric are silicon monoxide or magnesium fluoride. These materials provide matching coefficients of thermal expansion for the thin magnetic film material. In addition, they can withstand the thermal treatment needed for the fabrication of thin magnetic films. Other materials, however, may be suitable. The simplest material for use as a thin magnetic film is 80% Ni—20% Fe permalloy. This composition minimizes magnetostrictive effects. Here too, other materials may be satisfactory.

The dielectric films are preferably somewhat larger in area than the magnetic films, but they could have the same area. The area should not be smaller because the magnetic films should not be in direct contact with one another, that is, they should maintain their thin film characteristic.

To establish the proper direction of magnetization, the magnetic film may be vapor deposited in a bell jar which is surrounded by magnets to establish a magnetic field through the bell jar which field is in the desired easy direction of magnetization. In other words, the magnetic field is parallel to the conductive strips, in which case the hard direction of magnetization will be perpendicular to the conductive strips, as is desired. Other methods may be used to control the direction of magnetization when depositing the films.

It is believed that the construction, operation, and method of fabrication of my improved solid state inductor, as well as the advantages thereof, will be apparent from the foregoing detailed description. The conductive strips form a coil around a magnetic core. The then superposed block of magnetic films above the upper conductive strips forms an additional core to help establish a more nearly closed, and therefore a more efficient magnetic circuit. The individual magnetic films are not in contact with one another, and because they are very thin films, and are used in proper direction of magnetization, there is no hysteresis loss, and the inductor has a linear characteristic.

It will be understood that the auxiliary block of thin magnetic films could be disposed beneath the lower conductive strips, instead of above the upper conductive strips, and indeed, blocks of magnetic films could be disposed both beneath the lower and above the upper conductive strips, thus forming a doubly closed magnetic circuit.

It will therefore be apparent that while I have shown and described the invention in a preferred form, changes may be made in the structure shown without departing from the scope of the invention, as sought to be defined in the following claims.

I claim:

1. An inductor comprising a bottom series of collateral conductive metal strips, a substantial number of alternating superposed layers of dielectric and magnetic films forming a relatively thick laminated thin-film magnetic structure, a top series of collateral conductive metal strips, a top strip being electrically connected at one end to a bottom strip and at the other end to the next bottom strip, whereby the ends of said top strips are so connected to the ends of the bottom strips that the successive top and bottom strips are connected in series to form a coil which is wound around the laminated magnetic structure, the latter acting as a core for the coil.

2. An inductor comprising a bottom series of collateral conductive metal strips, a substantial number of alternating superposed layers of dielectric and magnetic films forming a relatively thick laminated thin-film magnetic structure, a top series of collateral conductive metal strips, a top strip being electrically connected at one end to a bottom strip and at the other end to the next bottom strip, whereby the ends of said top strips are so connected to the ends of the bottom strips that the successive top and bottom strips are connected in series to form a coil which is wound around the laminated magnetic structure, the latter acting as a core for the coil, said magnetic films being anisotropic and being so disposed that the hard direction of magnetization is approximately perpendicular to the conductive strips and approximately parallel to the axis of the coil, the films immediately adjacent the conductive strips being dielectric films.

3. An inductor comprising a bottom series of collateral conductive metal strips, a substantial number of alternating superposed layers of dielectric and magnetic films forming a relatively thick laminated thin-film magnetic structure, a top series of collateral conductive metal strips, a top strip being electrically connected at one end to a bottom strip and at the other end to the next bottom strip, whereby the ends of said top strips are so connected to the ends of the bottom strips that the successive top and bottom strips are connected in series to form a coil which is wound around the laminated magnetic structure, the latter acting as a core for the coil, another substantial number of alternating superposed layers of dielectric and magnetic films outside said strips and forming another relatively thick laminated magnetic structure which helps more nearly close the magnetic path of the inductor, said magnetic films being anisotropic and being so disposed that the hard direction of magnetization is approximately perpendicular to the conductive strips and approximately parallel to the axis of the coil, the films immediately adjacent the conductive strips being dielectric films.

4. A solid state inductor comprising an insulating substrate having a bottom series of conductive metal strips deposited collaterally thereon, a substantial number of alternating superposed layers of dielectric and magnetic films deposited over said strips to form a relatively thick laminated thin-film magnetic structure, a top series of conductive metal strips deposited collaterally over said laminated magnetic structure, a top strip being electrically connected at one end to a bottom strip and at the other end to the next bottom strip, whereby the ends of said top strips are so connected to the ends of the bottom strips that the successive top and bottom strips are connected in series to form a coil which is wound around the laminated magnetic structure, the latter acting as a core for the coil.

5. A solid state inductor comprising an insulating substrate having a bottom series of conductive metal strips deposited collaterally thereon, a substantial number of alternating superposed layers of dielectric and magnetic films deposited over said strips to form a relatively thick laminated thin-film magnetic structure, a top series of conductive metal strips deposited collaterally over said laminated magnetic structure, a top strip being electrically connected at one end to a bottom strip and at the other end to the next bottom strip, whereby the ends of said top strips are so connected to the ends of the bottom strips that the successive top and bottom strips are connected in series to form a coil which is wound around the laminated magnetic structure, the latter acting as a core for the coil, another substantial number of alternating superposed layers of dielectric and magnetic films deposited over said strips to form another relatively thick laminated magnetic structure, the films immediately adjacent the conductive strips being dielectric films, and the resulting two free ends of the strips serving as terminals for the inductor.

6. A solid state inductor comprising an insulating substrate having a bottom series of conductive metal strips deposited collaterally thereon, a substantial number of alternating superposed layers of dielectric and magnetic films deposited over said strips to form a relatively thick laminated thin-film magnetic structure, a top series of conductive metal strips deposited collaterally over said laminated magnetic structure, a top strip being electrically connected at one end to a bottom strip and at the other end to the next bottom strip, whereby the ends of said top strips are so connected to the ends of the bottom strips that the succesive top and bottom strips are connected in series to form a coil which is wound around the laminated magnetic structure, the latter acting as a core for the coil, said magnetic films being anisotropic and being so disposed that the hard direction of magnetization is approximately perpendicular to the conductive strips and approximately parallel to the axis of the coil, the films immediately adjacent the conductive strips being dielectric films, and the resulting two free ends of the strips serving as terminals for the inductor.

7. A solid state inductor comprising an insulating substrate having a bottom series of conductive metal strips deposited collaterally thereon, a substantial number of alternating superposed layers of dielectric and magnetic films deposited over said strips to form a relatively thick laminated thin-film magnetic structure, a top series of conductive metal strips deposited collaterally over said laminated magnetic structure, a top strip being electrically connected at one end to a bottom strip and at the other end to the next bottom strip, whereby the ends of said top strips are so connected to the ends of the bottom strips that the strips are connected in series to form a coil which is wound around the laminated magnetic structure, the latter acting as a core for the coil, another substantial number of alternating superposed layers of dielectric and magnetic films deposited over said strips to form another relatively thick laminated magnetic structure, said magnetic films being anisotropic and being so disposed that the hard direction of magnetization is approximately perpendicular to the conductive strips and approximately parallel to the axis of the coil, the films immediately adjacent the conductive strips being dielectric films, and the resulting two free ends of the strips serving as terminals for the inductor.

8. A solid state inductor as defined in claim 4 in which the core has from twenty to fifty magnetic films.

9. A solid state inductor as defined in claim 6 in which the core has from twenty to fifty magnetic films.

10. A solid state inductor as defined in claim 5 in which the two magnetic structures each have from twenty to fifty magnetic films.

11. A solid state inductor as defined in claim 7 in which the two magnetic structures each have from twenty to fifty magnetic films.

References Cited by the Examiner

UNITED STATES PATENTS

| | | | |
|---|---|---|---|
| 2,898,241 | 8/59 | Charlton et al. | 117—212 |
| 2,960,417 | 11/60 | Strother | 117—212 |
| 3,058,099 | 10/62 | Williams | 340—174 |
| 3,068,453 | 12/62 | Broadbent | 340—174 |
| 3,080,541 | 3/63 | Parker | 336—200 |
| 3,089,106 | 5/63 | Saaty | 336—200 |
| 3,113,297 | 12/63 | Dietrich | 340—174 |
| 3,125,746 | 3/64 | Broadbent | 340—174 |
| 3,129,412 | 4/64 | Lovell | 340—174 |

KATHLEEN H. CLAFFY, *Primary Examiner.*

JOHN F. BURNS, LARAMIE E. ASKIN, *Examiners.*